US006888498B2

(12) United States Patent
Brenner et al.

(10) Patent No.: US 6,888,498 B2
(45) Date of Patent: May 3, 2005

(54) METHOD AND SYSTEM FOR COMPENSATING SATELLITE SIGNALS

(75) Inventors: Mats Brenner, Plymouth, MN (US); Randy J. Reuter, Brooklyn Park, MN (US); Paul A. Kline, Brooklyn Park, MN (US)

(73) Assignee: Honeywell International, Inc., Morristown, NJ (US)

( * ) Notice: Subject to any disclaimer, the term of this patent is extended or adjusted under 35 U.S.C. 154(b) by 8 days.

(21) Appl. No.: 10/668,011

(22) Filed: Sep. 22, 2003

(65) Prior Publication Data

US 2004/0056796 A1 Mar. 25, 2004

Related U.S. Application Data

(60) Provisional application No. 60/413,251, filed on Sep. 24, 2002, provisional application No. 60/413,211, filed on Sep. 24, 2002, provisional application No. 60/413,252, filed on Sep. 24, 2002, and provisional application No. 60/413,080, filed on Sep. 24, 2002.

(51) Int. Cl.$^7$ ............................ G01B 5/02; H04B 7/185
(52) U.S. Cl. .................................. 342/357.15; 701/215
(58) Field of Search ...................... 342/357.15; 701/215

(56) References Cited

U.S. PATENT DOCUMENTS

| | | | |
|---|---|---|---|
| 4,218,654 A | 8/1980 | Ogawa et al. ................. | 370/97 |
| 5,805,983 A | 9/1998 | Naidu et al. ............... | 455/67.6 |
| 6,121,923 A | 9/2000 | King | |
| 6,219,373 B1 | 4/2001 | Lee et al. | |
| 6,295,024 B1 | 9/2001 | King et al. | |
| 6,313,789 B1 | 11/2001 | Zhodzishsky et al. | |
| 6,407,699 B1 | 6/2002 | Yang | |

FOREIGN PATENT DOCUMENTS

| | | |
|---|---|---|
| EP | 0 582 233 | 9/1999 |
| EP | 1 114 663 | 10/2001 |
| EP | 1 182 796 | 2/2002 |

OTHER PUBLICATIONS

"Category 1 Local Area Augmentation System Ground Facility", Specification FAA–E–2937 A; United States Department of Transportation Federal Aviation Administration, Apr. 17, 2002.

Ward, Phillip, "Effects of RF Interference on GPS Satellite Signal Receiver Tracking," Understanding GPS Principles and Applications, Chapter 6, pp. 209–236, 1996.

Jakab, A., "An Approach to GPS Satellite Failure Detection," NovAtel Inc.

Hartman, Randy, "LAAS Government Industry Partnership (GIP)," Honeywell International Inc.

Hartman, Randy, "Precision Approach Using Differenetial GPS;" Honeywell International Inc.

Ray, J.K. et al., "Characterization of GPS Carrier Phase Multipath," Department of Geomatics Engineering, university of Calgary, Alberta, Canada, ION NTM–99, San Diego, Jan. 25–27, 1999.

(Continued)

*Primary Examiner*—Theodore M. Blum
(74) *Attorney, Agent, or Firm*—McDonnell Boehnen Hulbert & Berghoff LLP (57) ABSTRACT

A method and system pertaining to a dual antenna compensation algorithm is provided. A local area augmentation system may include a dual antenna system to receive signals from satellites. The system may switch between the antennas to receive signals, and the transition between the antennas should be seamless. Thus, phase variations between the antennas can be determined to correct for code phase variations, and hardware delays between the antennas can be determined to correct for delay differences in signals received from both antennas.

21 Claims, 6 Drawing Sheets

OTHER PUBLICATIONS

Maurer, M. et al., "Advanced Receiver Technology For Existing and Future Satellite Navigation Systems," International Journal of Satellite Communications, 2000; 18: pp. 347–364.

Upadhyay, Triveni et al., "Test Results on Mitigation of SATCOM–Induced Interference to GPS Operation," http://www1.faa.gov/and/and/300/datalink/dlsys/satcom.htm, printed May 2003.

"About the Radio Frequency Interference Monitoring System (RFIMS)," Institute For Telecommunications Sciences, http//www.its.bldrdoc.gov/home/programs/rfilms/rfilms.html, printed Feb. 4, 2003.

Legrand, Fabrice et al., "Real–Time Minimization of the Total Tracking Error In Phase and Delay Lock Loops—A Second Approach of the Fast Adaptive Bandwidth Algorithm," http://www.recherche.enac.fr/ltst/papers/ion_am_01.pdf, printed May, 2003.

Saarnisaari, Harri, "Phase Interference Extractor Extractor Interference Canceller In DS/SS Code Synchronization," http://www/cwc.oulu.fi/home/projects/AWICS/awics_pub/2000/harri_saarnisaari_euroco00.pdf, printed Mar. 17, 2003.

Landry, Rene Jr. et al., "Analysis of Potential Interference Sources and Assessment of Present Solutions for GPS/GNSS Receivers," $4^{th}$ Saint–Petersburg on INS, May 26–28, 1997.

Ali–Ahmad, Walid, Ph.D., "RF System Issues Related to CDMA Receiver Specifications," RF Standards, Sep. 1999.

"Adaptive Interference Cancellation: The Latest Weapon Against Interference," http://www.cyberrf.com/appnote/cancAppnote2.htm, printed Feb. 4, 2003, pp. 1–5.

Butsch, Felix, "Innovation: A Growing Concern Radiofrequency Interference and GPS," GPS World, Oct. 2002.

Macabiau, Christophe et al., "Use of MultiCorreltor Techniques For Interference Detection," http://www.recherche.enac.fr/ltst/papers/ion_ntm_2001_interf.pdf, printed Mar. 17, 2003.

Bastide, Frederic et al., "GPS Interference Detection and Identification Using Multicorrelator Receivers," http://www.recherche.enac.fr/ext/ltst/papers/Ion_gps_01.pdf, printed on Mar. 10, 2003.

Maenpa, Jon E. et al., "New Interference Rejection Technology From Leica," Leica Geosystems Inc., Sep. 1997.

Ober, P.B. et al., "The Suitability of GPS For Basic Area Navigation," $10^{th}$ International Technical Meeting of the Satellite Division of the Institute of Navigation, ION GPS–97, Sep. 16–19, 1997.

Volpe, John A., "Vulnerability Assessment of the Transportation Infrastructure Relying On the Global Positioning System," Final Report, U.S. Department of Transportation, Aug. 29, 2001.

Gromov, Konstantin, "GIDL: Generalized Interference Detection and Localization System," Dissertation submitted to the Department of Aeronautics and Astronautics and the Committee on Graduate Studies of Stanford University in partial fulfillment of the requirements for the degree of Doctor of Philosophy, Mar. 2002.

Phlets, Robert Eric, "Multicorrelator Techniques for Robust Mitigation of Threats to GPS Signal Quality," A dissertation submitted to the department of mechanical engineering and the committee of graduated studies of Stanford University in partial fulfillment of the requirements for the degree of Doctor of Philosophy, Jun. 2001.

International Search Report

METHOD AND SYSTEM FOR COMPENSATING SATELLITE SIGNALS

PRIORITY

The present patent application claims priority under 35 U.S.C. §119(e) to the following U.S. Provisional Patent Applications, the full disclosures of which are each incorporated herein by reference.

U.S. Provisional Patent Application Serial No. 60/413,251; filed on Sep. 24, 2002, entitled "Dual Antenna Adaptive Compensation Algorithm," to Brenner et al.

U.S. Provisional Patent Application Serial No. 60/413,211; filed on Sept. 24, 2002, entitled "Low Power Detection and Compensation for Satellite Systems," to Brenner.

U.S. Provisional Patent Application Serial No. 60/413,252; filed on Sep. 24, 2002, entitled "Signal Deformation Monitor," to Brenner.

U.S. Provisional Patent Application Serial No. 60/413,080; filed on Sep. 24, 2002, entitled "Radio Frequency Interference Monitor," to Brenner.

FIELD OF INVENTION

The present invention relates generally to satellite systems and, more particularly, to a method and system for compensating satellite signals.

BACKGROUND

Pilots typically use landing navigation systems when they are landing an aircraft. These systems assist the pilot in maintaining the aircraft along a predetermined glide path associated with a particular landing strip or runway. In general, ground-based navigational systems are employed. Two common ground-based navigation systems currently in use are the Instrument Landing System (ILS) and the Microwave Landing System (MLS).

Due to limitations in the ILS and MLS Systems, including cost and single approach limitations, the Federal Aviation Administration (FAA) is transitioning the National Airspace System (NAS) from ground-based navigational systems to satellite-based navigational systems. In this endeavor, the FAA, with assistance from industry, is developing a Local Area Augmentation System (LAAS) to provide a satellite-based aircraft landing solution, which is designed to assist the pilot during approach and landing of an aircraft.

The LAAS uses a differential global positioning system (DGPS). The DGPS includes a global positioning system (GPS) and at least one ground station. The GPS uses a number of orbiting satellite stations and a receiver on an aircraft to determine the position of the aircraft with respect to the ground. With the satellite information, the receiver on the aircraft can determine the position, speed, and altitude of the aircraft. By adding a ground station, the DGPS can correct errors that may occur in the transmission of data from the satellites to the receiver on the aircraft. As a result, the DGPS may determine the position of the aircraft with a high degree of accuracy.

In 1998, the FAA initiated a program to develop requirements for developing and deploying a LAAS Ground Facility (LGF). The LGF will monitor the satellite constellation, provide the LAAS corrections and integrity data, and provide approach data to an interface with air traffic control. As a result of this program, the FAA released Specification, FAA-E-2937A, for a Category I LGF on Apr. 17, 2002, the contents of which are herein incorporated by reference. This specification establishes the performance requirements for the LGF.

The FAA specification requires the LGF to include a receiving antenna that meets specific requirements. With today's technology, a dual antenna may be required to meet the specific requirements. These two antennas are also referred to as the lower and upper antenna.

SUMMARY

In the exemplary embodiment, an antenna receiving system is provided. The system includes a first antenna, a second antenna, and a processor. The first antenna can receive satellite signals from a first coverage area, and the second antenna can receive satellite signals from a second coverage area. A transition zone exists where a portion of the second coverage area overlaps a portion of the first coverage area. The processor receives satellite signals from the first antenna and from the second antenna and compensates for differences of delays in the satellite signals received within the transition zone.

In another respect, the exemplary embodiment may take the form of a method for adjusting pseudorange values. The method may be performed in a dual antenna receiving system. The method includes determining a first pseudorange value from signals received at a first antenna and determining a second pseudorange value from signals received at a second antenna. The method further includes making a comparison of the first pseudorange value and the second pseudorange value, and based on the comparison, adjusting the first pseudorange value.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described herein with reference to the drawings, in which.

DETAILED DESCRIPTION OF EXEMPLARY EMBODIMENTS

Definitions:

As utilized in accordance with the present disclosure, the following acronyms, unless otherwise indicated, shall be understood to have the following meanings:

Air Traffic Control Unit (ATCU)
Area Navigation (RNAV)
Differential Global Positioning System (DGPS)
Environmental Management (ENV)
European Geo-stationary Navigation Overlay System (EGNOSS)
Federal Aviation Administration (FAA)
Global Navigation Satellite System (GLONASS)
Global Positioning System (GPS)
High Zenith Array (HZA)
Instrument Landing System (ILS)
LAAS Ground Facility (LGF)
Local Area Augmentation System (LAAS)
Local Status Panel (LSP)
Microwave Landing System (MLS)
Mobile Data Terminal (MDT)
National Airspace System (NAS)
NAS Infrastructure Management System (NIMS)
Personal Computer (PC)
Position, Velocity, and Time (PVT)
Pseudorandom Noise (PRN)
Reference Receivers (RR)
Satellite Vehicles (SVS)
Signals-In-Space (SIS)
Standard Positioning Service (SPS)
Very High Frequency (VHF)
Wide Area Augmentation System (WAAS)

Figure 1:
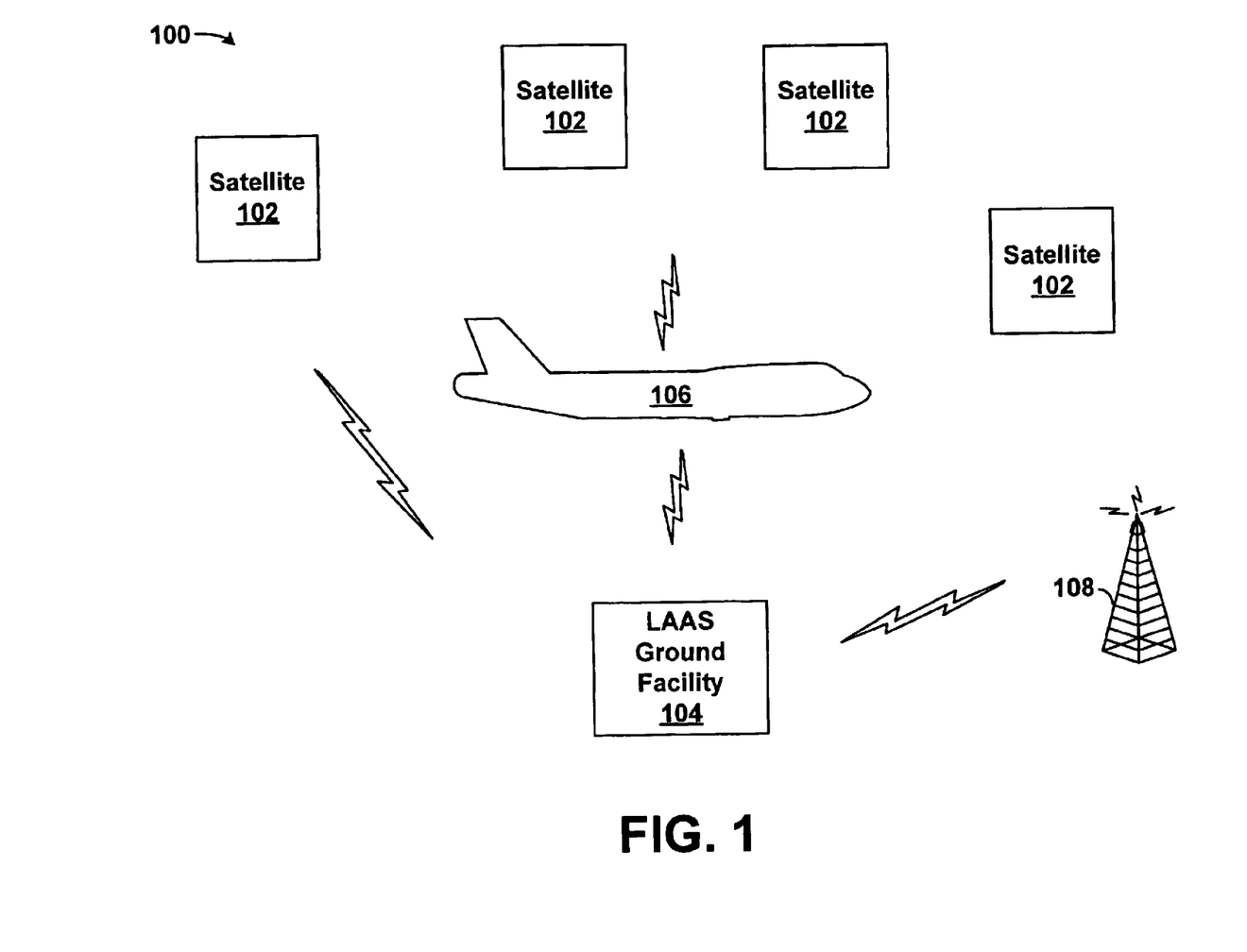
FIG. 1 is a simplified block diagram illustrating one example of a Local Area Augmentation System (LAAS), in which an exemplary embodiment of the present invention can be implemented.

Referring now to the figures, and more particularly to FIG. 1, one embodiment of a LAAS 100 is illustrated. It should be understood that the LAAS 100 in FIG. 1 and other arrangements described herein are set forth for purposes of example only, and other arrangements and elements can be used instead and some elements may be omitted altogether, depending on manufacturing preferences.

The LAAS 100 augments a DGPS system. The LAAS 100 includes a plurality of satellites 102 and an LGF 104 for providing precision approach data and landing capability to an aircraft 106.

The plurality of satellites 102 provide the aircraft 106 and the LGF 104 with GPS ranging signals and orbital parameters. The LGF 104 may provide differential corrections, integrity parameters, and precision approach pathpoint data to the aircraft 106. The aircraft 106 may apply the LGF corrections to the GPS ranging signals to accurately determine its position. Communication between the LGF 104 and the aircraft 106 may be conducted using VHF data broadcast, for example.

In addition, the LGF 104 may provide status information to air traffic control 108 via an ATCU. The ATCU provides air traffic controllers with LGF status information and runway control capabilities. For maintenance purposes, LGF status information may be available on a LSP.

The LAAS 100 is generically representative of a satellite augmentation system in which an exemplary embodiment of the present invention can be implemented. The particular arrangement, however, may take any of a variety of forms.

The satellites 102 transmit radio signals to the LGF 104. The LGF 104 measures the amount of time it takes for the signal to travel from the satellites 102 to the LGF 104. The traveling speed of the signals is known because they are electromagnetic waves that travel at the speed of light, i.e., about 186,000 miles per second. Therefore, after determining how long it takes for them to arrive, the LGF 104 can determine how far the signals have traveled.

The satellites 102 may have accurate and synchronized clocks, so that they can correlate transmission and reception times. The satellites 102 will transmit a code as part of its signal, such as a long digital pattern or a pseudo-random code. The LGF 104 will also use the same code; therefore when the satellite's signal reaches the LGF 104, the LGF 104 can determine the amount of time it took the signal to reach the LGF 104 based on the received code.

Figure 2:
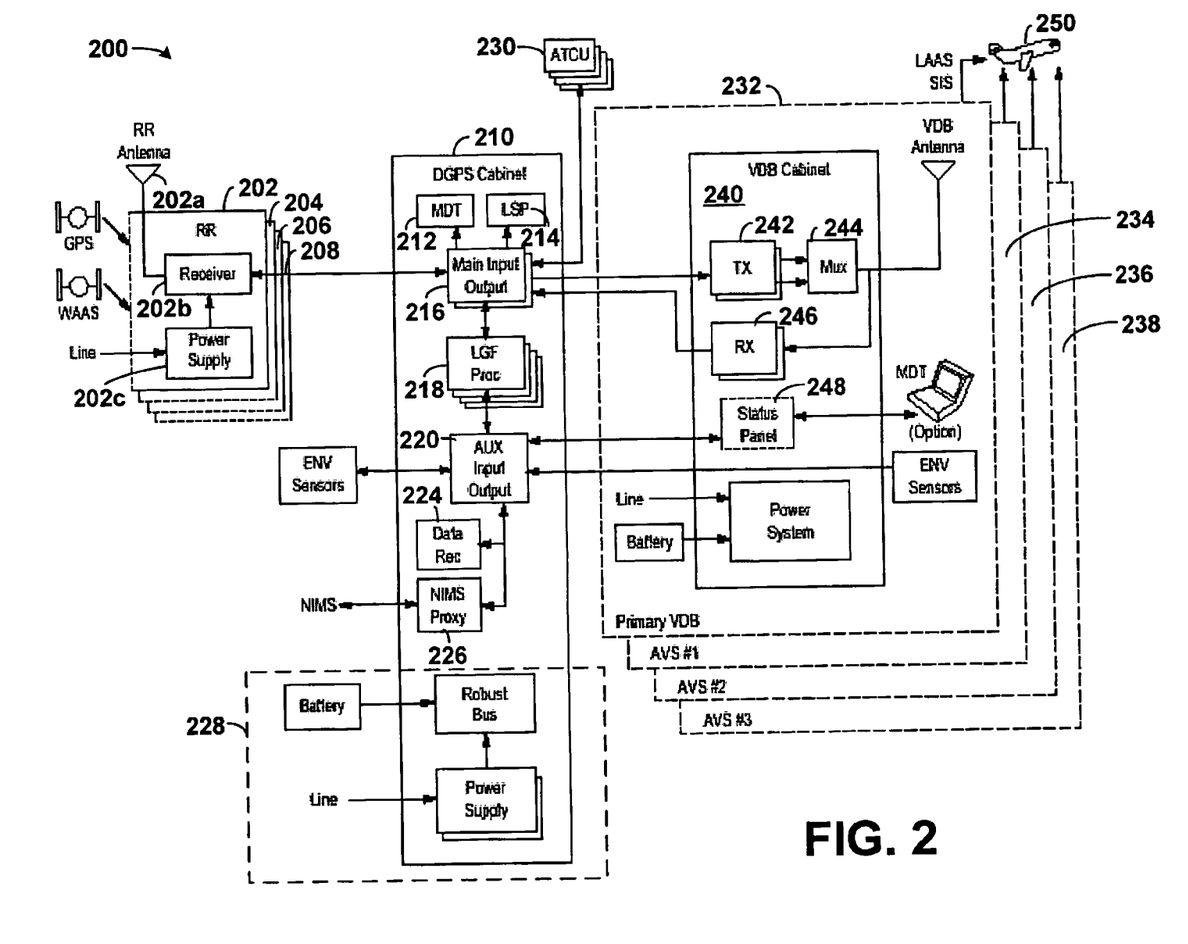
FIG. 2 is a block diagram illustrating one example of a Local Area Augmentation System Ground Facility (LGF), in which an exemplary embodiment of the present invention can be implemented.

The LGF 104 may include many components. FIG. 2 illustrates one embodiment of a LGF 200. The LGF 200 is shown to include multiple RR 202, 204, 206, 208. Exemplary RR 202 includes an antenna system 202a, a receiver 202b and a power supply 202c. The RR 202, 204, 206, and 208 receive signals transmitted from one or more GPS satellites, or possibly from a WAAS satellite as well. The RR 202, 204, 206, and 208 are coupled to a DGPS 210.

The DGPS 210 may include an MDT 212 and an LSP 214 coupled to a main input/output 216. The MDT 212 may be an interface to the LGF 200 to allow on-site maintenance and control. The DGPS 210 may also include a LGF processor 218 coupled to an auxiliary input/output 220, which may be connected to engineering and ENV sensors 222 and data recording 224 and NIMS processing equipment 226. The DGPS 210 may also include a power supply 228 that comprises a battery and/or an input power line. Furthermore, the DGPS 210 may couple to ATCU 230, which may be included within an air traffic control tower, such as airplane control tower 108 illustrated in FIG. 1.

The LGF 200 may also include VDB 232, 234, 236, and 238 coupled to the DGPS 210. Exemplary VDB 232 includes a VDB processing unit 240 comprising transmitters 242 coupled to a multiplexer 244, to transmit signals imposed on a carrier frequency, receivers 246, and a status panel 248. The VDB 232 transmits SIS to an airborne user 250.

The LGF 200 receives, decodes, and monitors GPS satellite signals and produces correction messages. To compute corrections, the LGF 200 compares the measured pseudo range to the predicted pseudorange based on its known location. Once the corrections are computed, a check is performed on the generated correction messages to help ensure that the messages will not produce misleading information for the users. The correction message, along with suitable integrity parameters and approach path information, is then sent to the airborne user 250 through VBD 232.

The airborne user 250 may include LAAS receivers that receive data sent from the LGF 200 and then compute accurate PVT information using the same data. This PVT is utilized for the RNAV guidance and for generating ILS-look-alike guidance to aid the aircraft on an approach.

In one embodiment, to meet the accuracy performance requirements of the LGF specification (FAA-E-2937A), the LGF 200 includes a dual antenna receiving system. Each RR 202, 204, 206, 208 includes an antenna system, such as antenna system 202a, which comprises two antennas, each covering different sections of the sky (i.e. different, but overlapping, subsets of elevation and azimuth angles). One antenna (referred to as the "upper" antenna) may be a single element antenna, which is directed to receive signals from the GPS satellites. The other antenna (referred to as the "lower" antenna) may comprise an antenna array, such as 14 antenna elements.

Figure 3:
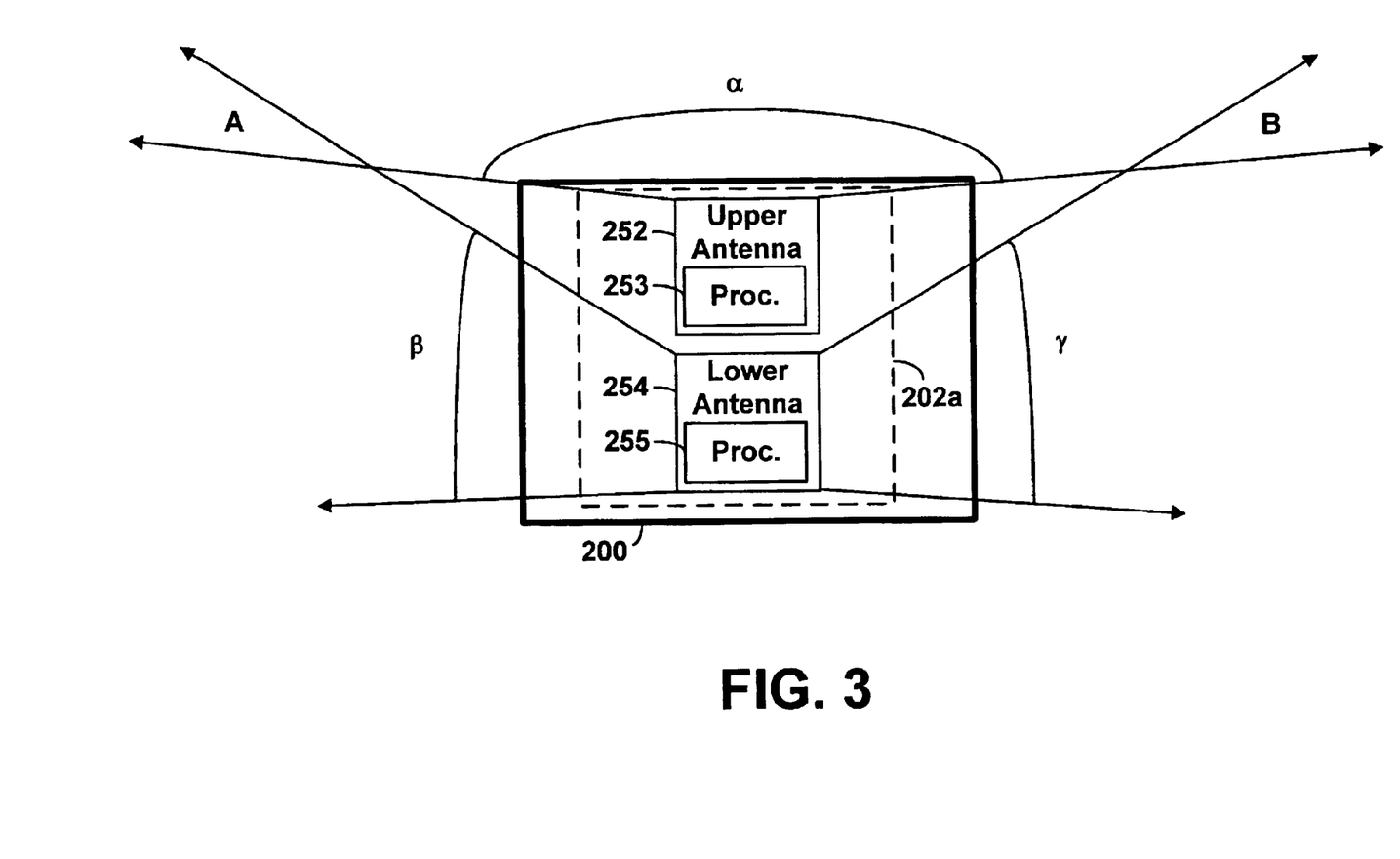
FIG. 3 is a block diagram illustrating one example of an alternate view of the LGF of FIG. 2.

FIG. 3 illustrates the LGF 200 including coverage areas of a first and a second antenna, such as upper and lower antennas 252, 254 of the antenna system 202a. Each antenna may be coupled to processing equipment 253 and 255. However, the processing equipment 253 and 255 may be combined within one processor as well. The LGF 200 may receive signals from the upper antenna 252, the lower antenna 254, or both. The upper antenna 252 may have a coverage area defined by angle α and the lower antenna 254 may have a coverage area defined by angles β and γ to the sides of the LGF 200. The upper and lower antennas 252 and 254 can have other coverage areas as well. The LGF 200 may switch between the upper and lower antennas 252, 254 to receive signals. For instance, the LGF 200 may track a satellite using the upper antenna 252 to receive the signals, but once the satellite moves to an angle below 30 degrees with respect to the horizon, for example, the LGF 200 may switch to the lower antenna 254 to receive the signals.

The upper antenna 252 may be designed to receive signals at elevation angles from 30 to 90 degrees. However, the upper antenna 252 may receive signals at other elevation angles as well. The upper antenna, often referred to as a High Zenith Antenna 252 may be a Bowl type antenna, which is physically mounted on top of a dipole array. The HZA can provide at least 20 dB of direct to indirect pattern isolation throughout its coverage volume.

The lower antenna 254 may be an array antenna that suppresses multipath signals coming from below the horizon. For example, the lower antenna 254 may have a low antenna gain for signals coming below the horizon such as about −40 decibels (dB). By suppressing multipath signals, errors within the DGPS 210 can be minimized. The lower antenna 254 may receive satellite signals at elevation angles between about 3 and about 30 degrees, for example. However, the lower antenna 254 may receive signals at other elevation angles as well. Signals from satellites at these elevation angles are generally lower in power and more susceptible to multipath interference from ground reflections, which can be received by the antenna 254 from beneath the desired reception pattern. The multipath signal can cause an error measurement proportional to the ratio of the signal strength of the desired direct transmission to the undesired multipath reflection signal strength.

The LGF 200 receives signals from satellites and measures the distance from itself to the satellites as a "pseudorange." By matching a time difference in the received signals of the PRN code generated by the satellite's atomic clock and the LGF's clock, the LGF 200 is able to calculate a time difference between the transmission and reception of a signal. Based on the calculated time difference and known value of the speed of light, the distance between the satellite and the LGF 200 can be determined (e.g., speed of light multiplied by time). Because of the clocks' discrepancy and the slowing of light through the atmosphere, this distance is referred to as a pseudorange. Thus, a pseudorange is calculated as a distance from the LGF 200 to the satellite. Thus, a pseudorange measurement, $\rho(t)$, is a satellite specific time (t) dependent measurement.

In operation, the LGF 200 receives the PRN code from a satellite and, having identified the satellite, generates a replica code. The phase by which the replica code must be shifted in the ground receiver to maintain maximum correlation with the satellite code (i.e., approximate propagation time of the signal), multiplied by the speed of light, is approximately equal to the satellite range. It is referred to as the pseudorange because the measurement must be corrected by a variety of factors to obtain the true range.

Transition zones, or overlap between the upper antenna 252 and the lower antenna 254 (i.e. a portion of the sky where they both see the same satellite), exist where a satellite is visible to both the upper and lower antenna 252 and 254. For example, FIG. 3 illustrates transition zone A and transition zone B. The transition zones translate into a time interval $[t_1, t_2]$ where pseudorange measurements are available from both antennas. As described above, pseudorange differs from the actual range by the amount that the satellite and receiver clocks are offset, by propagation delays, and other errors including those introduced by selective availability. A pseudorange measurement $\rho_U(t)$ may be obtained from signals received from the upper antenna 252 and a pseudorange measurement $\rho_L(t)$ may be obtained from signals received from the lower antenna 254.

From the time $t=t_1$, to determine these pseudorange signals $\rho_U(t)$ and $\rho_L(t)$, code phase center variations are determined. An antenna has many elements, and a phase center is a physical point in the antenna, which is an apparent center of received signals with respect to the PRN offsets that occur from the propagation of the signal. The phase center of an antenna is not constant, but is dependent upon an observation angle and the signal frequency. This point is not fixed since signals are continually received at various points along the antenna. A nominal phase center can be averaged from signals received along the antenna.

Figure 4:
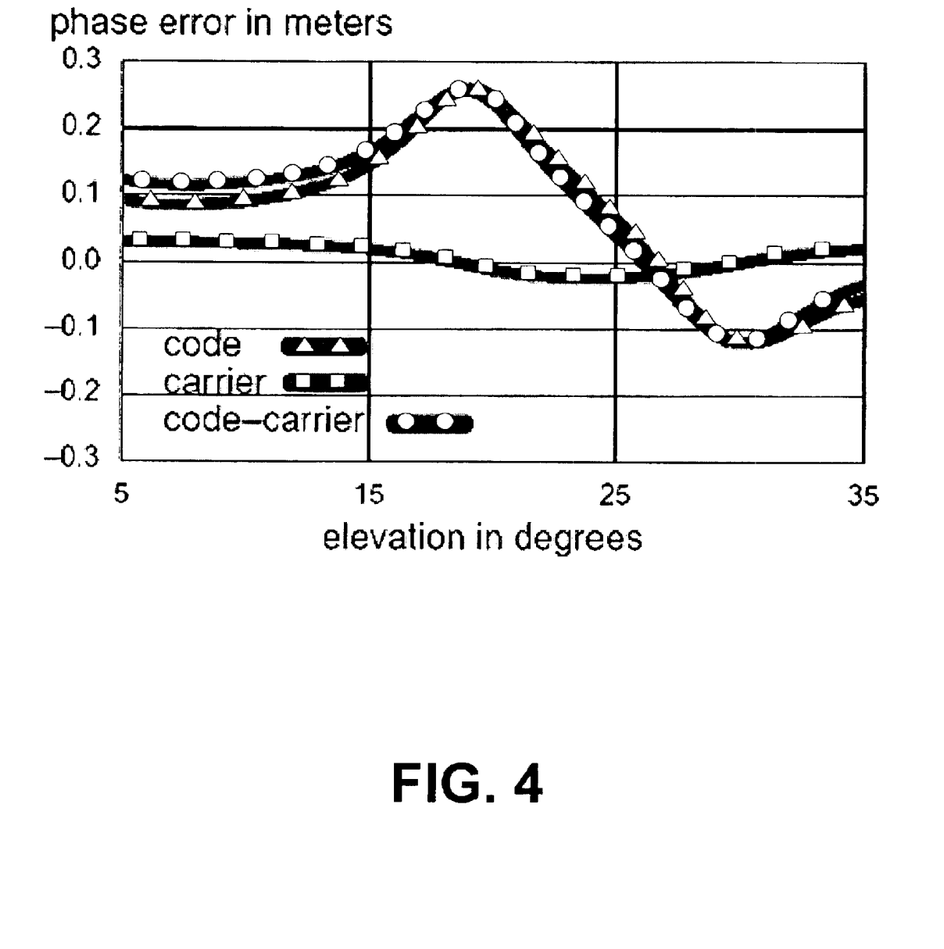
FIG. 4 illustrates one example of a plot of an estimation of a phase center variation of received satellite signals at the LGF with respect to an observation angle of the received signals.

FIG. 4 illustrates a plot of a prediction of a phase center variation with respect to received signals. The vertical axis is the error in the phase in meters relative to the nominal phase center of the antenna. The horizontal axis is the elevation in degrees of the antenna for the received signals. The plot illustrates the pseudorandom code, the carrier, and the code minus carrier in meters from an estimated center phase (denoted by 0.0). As illustrated, the phase center may vary to the right or to the left of the estimated center as denoted by positive and negative values. Any technique well-known in the art to measure the code-carrier may be used.

A code phase center variation is denoted $\phi_c(t)$. Let the code phase center variation for the upper and lower antenna 252, 254 be $\phi_{cU}(t)$ and $\phi_{cL}(t)$, respectively. The code phase center variation, $\phi_c(t)$, is typically dependent upon elevation but may also depend on other parameters such as azimuth, temperature and antenna specific parameters, some of which may be empirical. The code phase center variation is the amount by which the replica PRN code at the receiver is deformed to maintain maximum correlation with the satellite's PRN code.

A code phase center compensated pseudorange, $\rho_{phsc}(t)$, may be formed for each antenna (upper antenna code phase center compensated pseudorange, $\rho_{U\_phsc}(t)$, and lower antenna code phase center compensated pseudorange $\rho_{L\_phsc}(t)$) to compensate for the differences caused by phase center variations. The compensated pseudoranges are calculated as shown below.

$$\rho_{U\_phsc}(t) = \rho_U(t) - \phi_{cU}(t) \qquad \text{(Equation 1)}$$

$$\rho_{L\_phsc}(t) = \rho_L(t) - \phi_{cL}(t) \qquad \text{(Equation 2)}$$

After compensating for a variation in the code phase center as known in the art, the pseudorange values are then compensated and adjusted due to differences in delay caused by differences in the hardware of the upper and lower antennas. All receivers have a time delay resulting from the signal propagating from the antenna into a processor, through a cable and front end filter. Thus, what the LGF processors receive is not exactly what is received at the antenna due to signal delays caused by the hardware of the antennas. These hardware delays may cause substantial errors in calculations. For example, the processor matches a time difference in the received signals of the PRN code generated by the satellite's atomic clock and the LGF's clock to calculate a time difference between the transmission and reception of a signal, and if there is a substantial delay in the processor receiving the signal, then this calculation will not be accurate. A small delay can cause a calculation difference of several meters in a processed signal, for example.

The pseudorandom code and carrier phase centers of received signals are changing in the transition zones and a model (theoretical or empirical) of this change can be implemented to compensate for the phase center variation.

For a single antenna LGF system, a hardware delay is the same for all tracked satellites since all signals travel through the same front end cables, and this error cancels as the reference receiver clock error is removed. However, with a dual antenna system, some of the satellite signals are received from the upper high zenith antenna 252 and some of the satellite signals are received from the lower array antenna 254. In addition, since the upper antenna 252 and the lower antenna 254 use different filtering (based on component variations) and cables, signals received from each will have different delays.

The transition between the upper and lower antennas 252 and 254 should be seamless. However, the two antennas, including any cables and front end filters, may not be identical and, therefore, a delay related to the processing hardware 253, 255 may not be identical. This delay results in differences between pseudorange values calculated from signals received at the lower and upper antennas. Thus, compensation is required. The compensation may need to be adaptive since the hardware delay may change over time, with temperature, and when an antenna or receiver is removed and changed.

The difference in hardware delays is reflected in signals received from within the transition zones, since in the transition zones the LGF 200 receives signals from both the upper and lower antennas. The LGF 200 can calculate a hardware delay difference $\delta_{hw\_meas}(t)$ that is the difference in delay times in received signals from the different antennas, e.g., upper and lower antenna. The LGF 200 will then use this hardware delay calculation to adjust the signals received from the different antennas. For instance, the LGF 200 can compensate for the difference in delays in the pseudoranges calculated from the upper and lower antennas.

A hardware (group) delay difference $\delta_{hw\_meas}(t)$, as seen between signals received from the upper and lower antennas, may be calculated as follows:

$$\delta_{hw\_meas}(t) = \rho_{U\_phsc}(t) - \rho_{L\_phsc}(t) \quad \text{(Equation 3)}$$

The hardware delay difference $\delta_{hw\_meas}(t)$ is the difference in delay time as seen by the LGF 200 in received signals due to receiving signals from the different antennas, e.g., upper and lower antennas. If the hardware delay difference $\delta_{hw\_meas}(t)$ is positive, then the upper pseudorange value has a delay greater than the lower pseudorange value. If the hardware delay difference $\delta_{hw\_meas}(t)$ is negative, then the lower pseudorange value has a delay greater than the upper pseudorange value.

Figure 5:
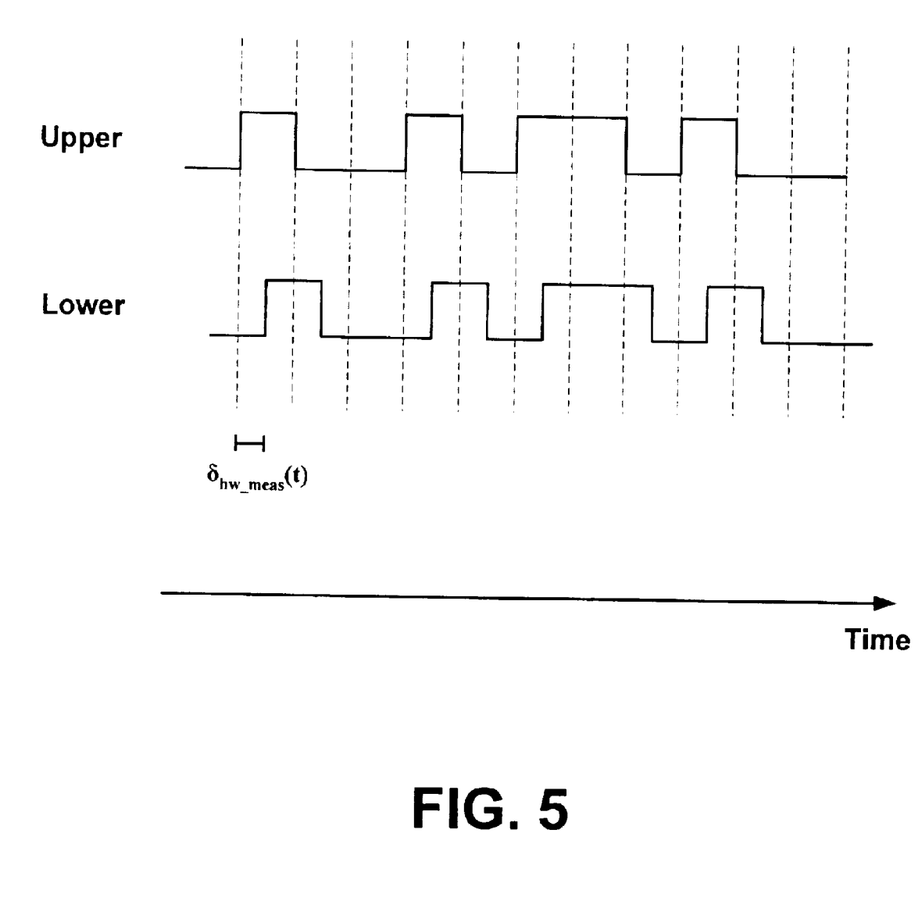
FIG. 5 illustrates one example of a plot of signals received from an upper and a lower antenna of the LGF.

FIG. 5 illustrates one conceptual example of a plot of signals received at the processors 253 and 255 from the upper and the lower antenna 252 and 254 of the LGF 200. This plot illustrates signals received within the transition zones. In this illustration, the hardware delay of the upper antenna is less than the hardware delay of the lower antenna. Therefore, the upper antenna's processor will receive the signal first. The lower antenna's processor will receive the signal after a delay $\delta_{hw\_meas}(t)$.

For each satellite that transmits signals to the LGF 200, all $\delta_{hw\_meas}(t)$ group delay differences that are within the interval $[t_1,t_2]$ may be averaged to form $\delta_{hw\_ave}$. This hardware delay average represents a new estimate. Let the current estimate used for compensation of all the satellite measurements from the upper antenna 252 or the lower antenna 254 in the LGF 200 be $\delta_{hw}(i)$. If there is a variation in the delay over time, as discussed above, then $\delta_{hw}(i)$ is adjusted.

Each time a satellite leaves the transition zone (either by rising or setting) or within a specific time from leaving the transition zone, the hardware delay difference may be updated as follows:

$$\delta_{hw}(i+1) = \delta_{ave}(i) + K(i)(\delta_{hw\_hw}(i)) \quad \text{(Equation 4)}$$

where $K(i)$ is a Kalman filter coefficient. This could, for instance, be a Kalman filter measurement update to estimate the hardware delay difference based on additive noise. For example, a variance $p_\delta(i)$ may be calculated and stored. The Kalman filter coefficient, $K(i)$, can then be determined based on $p_\delta(i)$, the variance in the new estimate $p_{\delta\_ave}$, and the variance $q(i)$ for the process noise added since the last update occurred. It is also possible to use a sub-optimal or constant $K(i)$. For more information on Kalman filtering, the reader is referred to OPTIMAL FILTERING, authored by Bryan D. O. Anderson and John B. Moore, published by Prentice-Hall 1979 Englewood Cliffs (N.J.), the contents of which are incorporated herein by reference.

To compensate the pseudorange signals $\rho_U(t)$ and $\rho_L(t)$ for hardware delays using the hardware group delay average, the hardware group delay average is either subtracted or added to the code phase center compensated pseudorange values in order to match the upper and lower antenna signals. This results in pseudorange signals that are now delay compensated, i.e., $\rho_{U\_delayc}(t)$, as shown below.

$$\rho_{L\_delayc}(t) = \rho_{L\_phsc}(t) - \delta_{hw}(i) \quad \text{(Equation 5)}$$

$$\rho_{U\_delayc}(t) = \rho_{U\_phsc}(t) \quad \text{(Equation 6)}$$

or $$\rho_{L\_delayc}(t) = \rho_{L\_phsc}(t) \quad \text{(Equation 7)}$$

$$\rho_{U\_delayc}(t) = \rho_{U\_phsc}(t) + \delta_{hw}(i) \quad \text{(Equation 8)}$$

For example, the hardware group delay average will be added to the upper pseudorange value if the upper pseudorange value has a delay less than a delay of the lower pseudorange value. Alternatively, the hardware group delay average could be subtracted from the lower pseudorange value if the lower pseudorange value has a delay greater than a delay of the upper pseudorange value. Either the upper or lower compensated pseudorange signals can be adjusted. If the delays of the pseudoranges are not equal, a ground station produces correction signals that that may not be correct.

Figure 6:
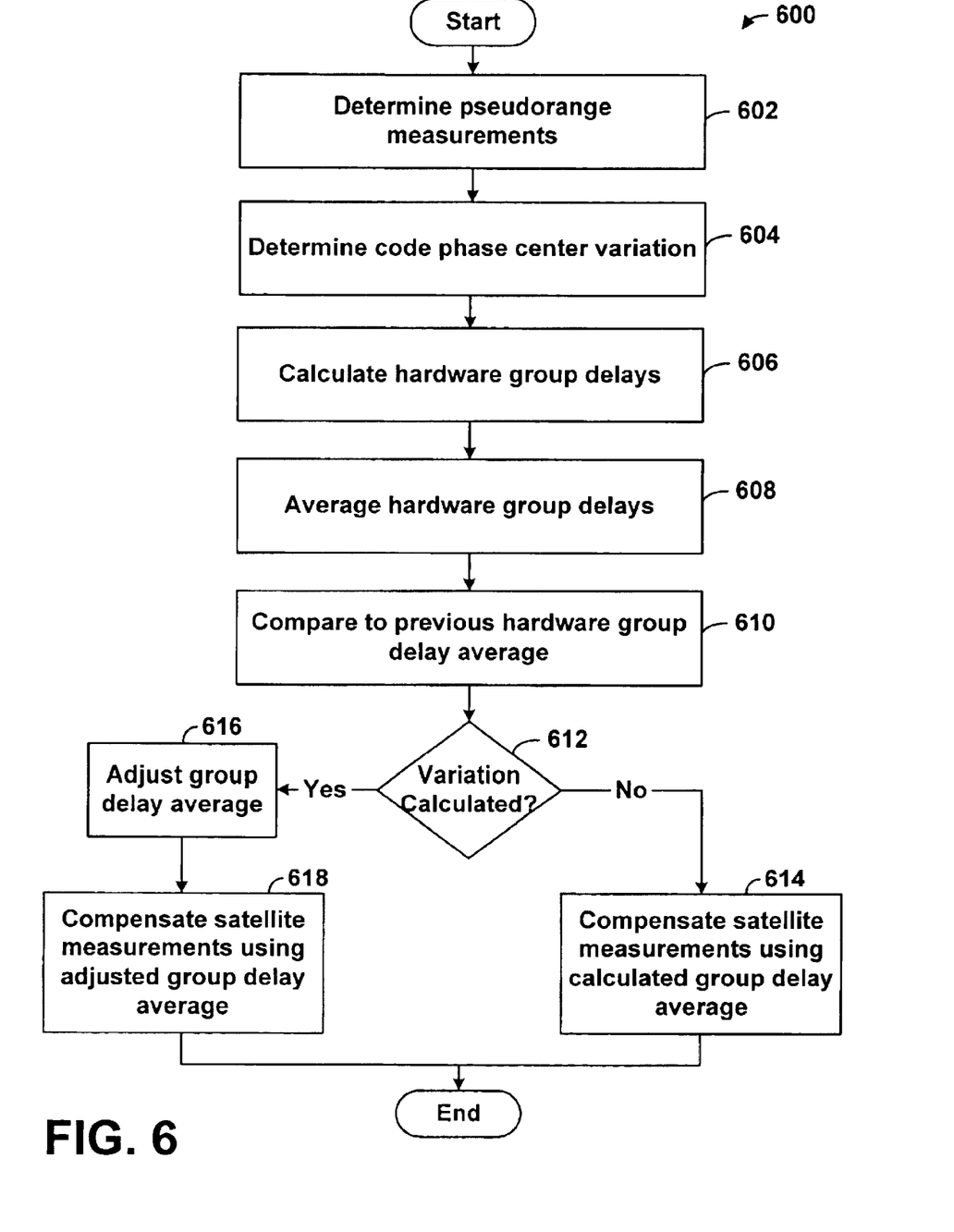
FIG. 6 is a flowchart depicting functional blocks of a compensation method according to one embodiment of the present invention.

FIG. 6 is a flowchart generally illustrating a method 600 according to this compensation process. As shown at block 602, initially pseudorange calculations from signals received at each antenna in the LGF are determined. In addition, as shown at block 604, the code phase center variation is determined. Using the pseudorange and the code phase center variation, the hardware group delays are then calculated, as shown at block 606. Following, the hardware group delays are averaged, as shown at block 608. The current hardware group delay average is then compared to the previous hardware group delay estimate, as shown at block 610, and if a variation is not calculated, as shown at block 612, then the satellite measurements are compensated using the current calculated group delay estimate, as shown at block 614. However, if a variation is calculated, then the group delay estimate is adjusted, as shown at block 616, and the satellite measurements are compensated by using the adjusted group delay average, as shown at block 618.

The present invention may be applied to any system utilizing signals from a satellite based positioning system such as GPS, GLONASS, Gallileo, WAAS or EGNOSS that uses dual antennas covering different sections of the sky, i.e., different (but overlapping) subsets of elevation and azimuth angles. Other examples are possible as well.

As one example, in the exemplary embodiment, an airborne and a ground station receive signals from satellites. As the signal passes through the atmosphere and ionosphere, the signal picks up propagation errors depending on humidity and different gases in the troposphere, for example. This results in errors in the signals. Since the location of the ground station is known, pseudoranges are measured and errors from the ionosphere, troposphere, and satellite position estimation errors are determined. This information is sent in a differential correction signal to the airborne so that the airborne system can remove these errors from the signals it receives from the satellites. Thus, the ground station informs the airborne of the errors that will be present within signals received from a GPS satellite. The airborne system can then calculate its position using the pseudorange values. If the pseudorange values contained different time delay errors (due to hardware delays in the ground station receiver), the airborne's calculations would be incorrect since the airborne assumes all pseudoranges will have a common time error.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. An antenna receiving system comprising:
    a first antenna configured to receive satellite signals from a first coverage area;
    a second antenna configured to receive satellite signals from a second coverage area, wherein a transition zone exists where a portion of the second coverage area overlaps a portion of the first coverage area; and
    a processor being operable to receive satellite signals from the first antenna and from the second antenna and to compensate for differences of delays in the satellite signals received within the transition zone.

2. The system of claim 1, wherein at least one of the first antenna and the second antenna comprises an antenna array.

3. The system of claim 1, wherein the first antenna is a high zenith antenna.

4. The system of claim 1, wherein the first antenna receives satellite signals at observation angles from about 30 to about 90 degrees.

5. The system of claim 1, wherein the second antenna receives satellite signals at observation angles from about 5 to about 30 degrees.

6. The system of claim 1, wherein the transition zone is an area where the first antenna and the second antenna have an observation angle in the range of about 25 to about 35 degrees.

7. The system of claim 1, wherein the processor compensates for differences of delays in the satellite signals received by adjusting a delay in the satellite signals received from the first antenna to match a delay in the satellite signals received from the second antenna.

8. The system of claim 1, wherein the processor compensates for differences of delays in the satellite signals received by adjusting a delay in the satellite signals received from the second antenna to match a delay in the satellite signals received from the first antenna.

9. The system of claim 1, wherein while a satellite is in the transition zone, the processor receives satellite signals from both the first antenna and the second antenna, and wherein the processor determines a first pseudorange value from the signals received at the first antenna and determines a second pseudorange value from the signals received at the second antenna.

10. The system of claim 9, wherein the processor uses the differences of delays in the satellite signals to match the delays of the satellite signals so as to synchronize the first pseudorange value and the second pseudorange value.

11. The system of claim 1, wherein the system is a Local Area Augmentation System (LAAS) Ground Facility (LGF).

12. In a dual antenna receiving system, a method comprising:
    determining a first pseudorange value from signals received within a first coverage area by a first antenna;
    determining a second pseudorange value from signals received within a second coverage area by a second antenna, wherein a transition zone exists where a portion of the second coverage area overlaps a portion of the first coverage area;
    making a comparison of the first pseudorange value and the second pseudorange value that were each determined from signals received within the transition zone; and
    based on the comparison, adjusting the first pseudorange value.

13. The method of claim 12, wherein making the comparison of the first pseudorange value and the second pseudorange value comprises calculating a difference in delays between the first pseudorange value and the second pseudorange value.

14. The method of claim 13, wherein adjusting the first pseudorange value comprises adding the difference in delays to the first pseudorange value if the first pseudorange value has a delay that is less than a delay of the second pseudorange value.

15. The method of claim 13, wherein adjusting the first pseudorange value comprises subtracting the difference in delays from the first pseudorange value if the first pseudorange value has a delay that is greater than a delay of the second pseudorange value.

16. The method of claim 12, further comprising:
    determining a first phase center variation of signals received at the first antenna; and
    determining a second phase center variation of signals received at the second antenna.

17. The method of claim 16, further comprising adjusting the first pseudorange value using the first phase center variation and adjusting the second pseudorange value using the second phase center variation.

18. In a dual antenna receiving system, a method comprising:
    determining a first pseudorange value from signals received at a first antenna;
    determining a second pseudorange value from signals received at a second antenna;
    calculating a difference in hardware group delays between the first pseudorange value and the second pseudorange value;
    calculating an estimate of the difference in hardware group delays over a time interval;

comparing the estimate to a previous estimate of the differences in hardware group delays; and if a variation between the estimate and the previous estimate is present:
calculating an adjusted estimate of the differences in hardware group delays; and
adjusting the first pseudorange value using the adjusted estimate.

19. The method of claim 18, wherein if no variation between the estimate and the previous estimate is present, the step of adjusting comprises adjusting the first pseudorange value using the estimate.

20. A method comprising:
using two or more antennas to receive satellite signals, where each antenna has a respective field of view, and where a transition zone exists where satellite signals are received from each of the two or more antennas;

means for determining a phase center variation as a function of time from the satellite signals to determine pseudorange values;
means for compensating for the phase center variation in the satellite signals received from within the transition zone;
means for forming hardware group delay estimates of delays within the satellite signals received within the transition zone;
means for averaging the hardware group delay estimates to calculate a hardware group delay average; and
means for compensating the satellite signals using the hardware group delay average.

21. The method of claim 20, further comprising means for updating a current hardware group delay estimate based on previous hardware group delay estimates.

* * * * *